C. E. HEWSTON AND H. G. HAMILTON.
NON-SKID ATTACHMENT FOR AUTOMOBILES.
APPLICATION FILED JULY 9, 1917.
1,326,343.
Patented Dec. 30, 1919.
2 SHEETS—SHEET 1.
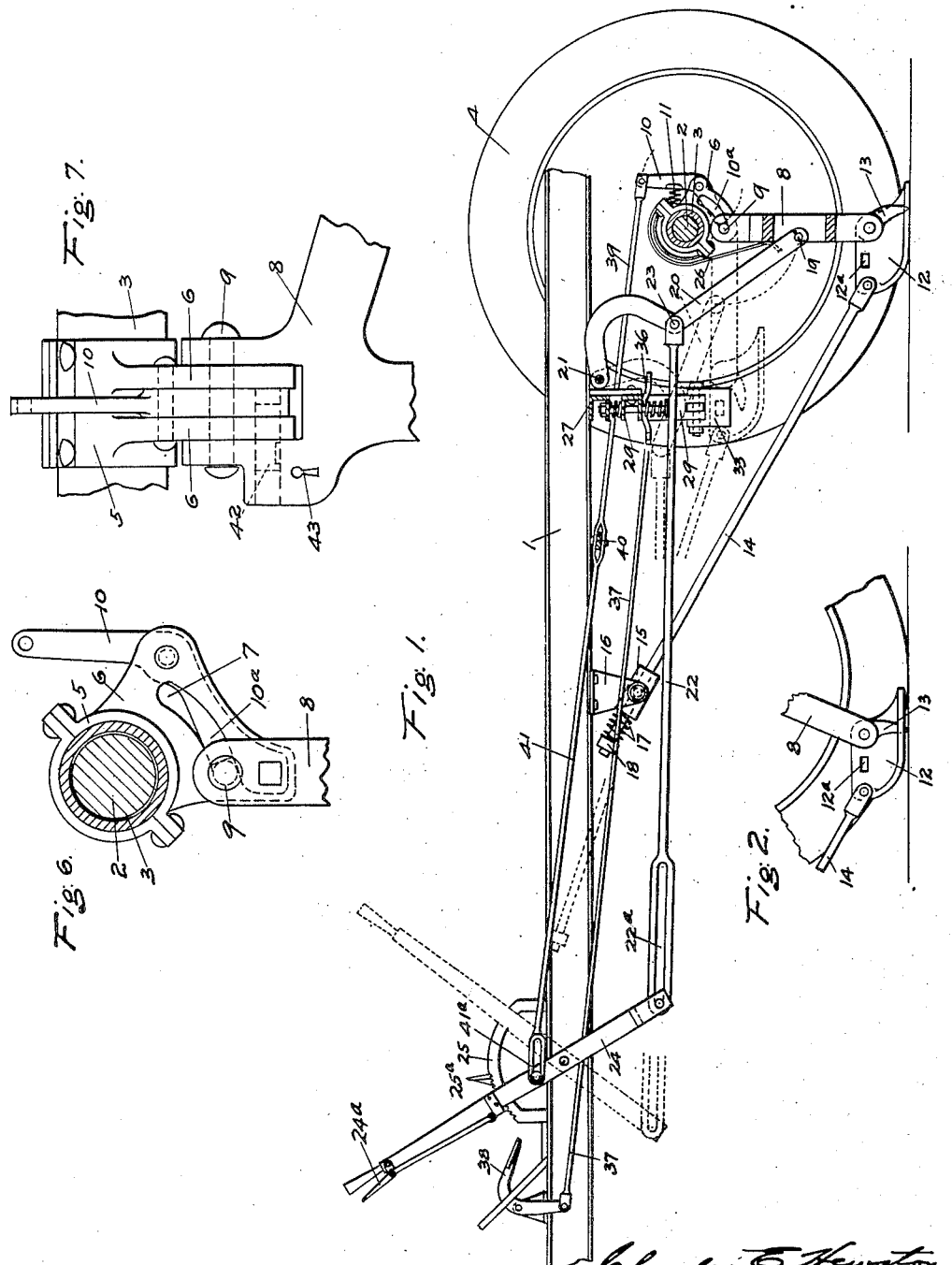
Charles E. Hewston
Herbert G. Hamilton
Inventors.
By 
Att'y.

C. E. HEWSTON AND H. G. HAMILTON.
NON-SKID ATTACHMENT FOR AUTOMOBILES.
APPLICATION FILED JULY 9, 1917.
1,326,343. Patented Dec. 30, 1919.
2 SHEETS—SHEET 2.
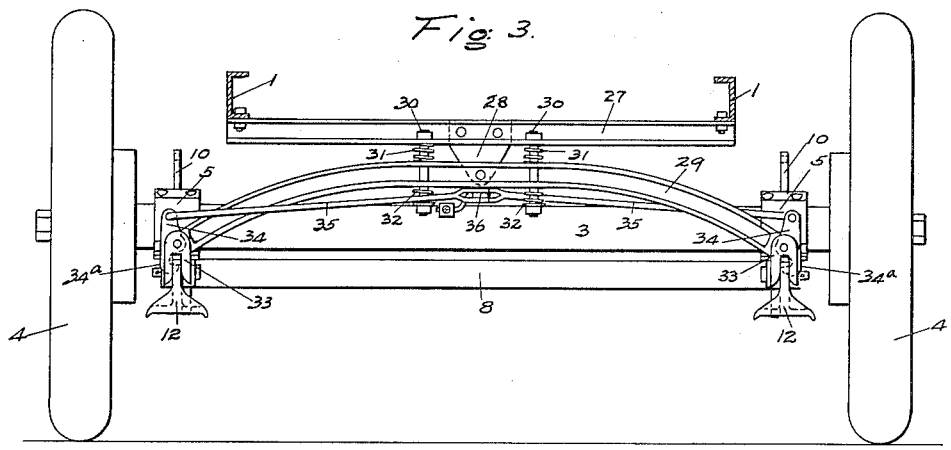
Fig. 3.
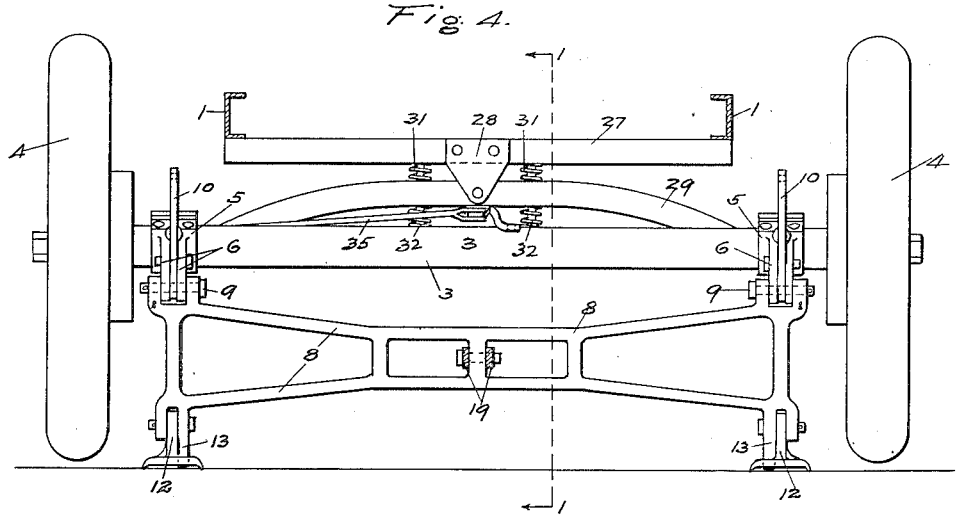
Fig. 4.
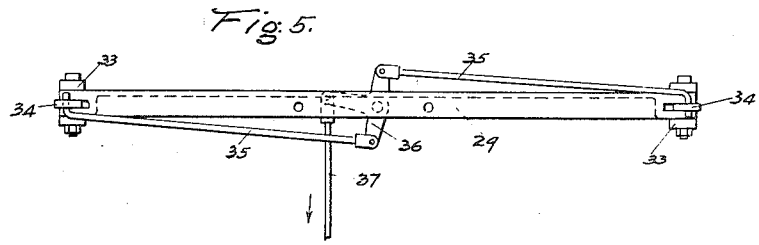
Fig. 5.

UNITED STATES PATENT OFFICE.

CHARLES E. HEWSTON AND HERBERT G. HAMILTON, OF PORTLAND, OREGON.

NON-SKID ATTACHMENT FOR AUTOMOBILES.

1,326,343.

Specification of Letters Patent.  Patented Dec. 30, 1919.

Application filed July 9, 1917. Serial No. 179,411.

*To all whom it may concern:*

Be it known that we, CHARLES E. HEWSTON and HERBERT G. HAMILTON, citizens of the United States, residing in the city of Portland, county of Multnomah, and State of Oregon, have invented certain new and useful Improvements in Non-Skid Attachments for Automobiles, of which the following is a specification.

Our invention relates to non-skid attachments for automobiles, and more particularly to a device adapted to be attached to the rear axle casing and chassis of an automobile, whereby it can be tripped and dropped down between the rear wheels of the automobile so that its shoes will engage the surface in such a manner as to absolutely prevent skidding of the car and to immediately stop any skidding movement thereof in either direction, as well as to act as a most effective emergency brake.

Among the salient objects of our invention are,—

To provide a device of the character referred to which can be controlled by the driver, both in tripping the device to allow it to drop down into operating position, and again restoring it to its up or in-operative position; to provide a device of the character referred to which will operate to lift the rear wheels of an automobile clear of the ground, or pavement, when in operation, thus adapting it also for use as a jack; and, in general, to provide a device of the character referred to which will be practical, strong and effective, and which can be readily adapted to automobiles of different makes.

In order to more fully explain our invention, we have illustrated one practical embodiment thereof in the accompanying sheet of drawings, which we will now describe.

Figure 1 is a fragmentary, longitudinal, sectional view of an automobile chassis, showing our invention attached thereto, said view being taken on the position 1—1 of Fig. 4;

Fig. 2 is a fragmentary, detail view showing the holding shoe about to engage the surface;

Fig. 3 is a cross sectional view of an automobile chassis looking rearwardly with our device raised;

Fig. 4 is a rear view showing our device in operative position;

Fig. 5 is a detail view showing certain operating mechanisms for holding the device in its raised or inoperative position;

Fig. 6 is an enlarged, sectional view through the rear axle housing showing one of the attaching brackets for the device; and Fig. 7 is a view thereof looking at the right hand side of Fig. 6, and showing a lock therefor.

Referring now more in detail to the drawings, 1 designates the channel iron frame members of an automobile chassis, 2 the rear axle, 3 the rear axle housing and 4—4 the rear wheels.

Clamped around the rear axle housing adjacent each of the rear wheels is a clamp bracket 5. Formed as a part of each is a pair of spaced winglike members 6—6, having therein curved slots 7—7. Pivotally connected at its opposite ends to said wing-like members is a drop frame 8, said drop frame being pivoted, as at 9—9, in the slots 7—7, in said wing-like members 6—6, as clearly shown. Pivotally secured between each pair of wing-like members 6—6, is a bell crank lever 10, the end of the lower arm 10$^a$ of which normally bears against the pivot bolt 9, by means of which the drop frame 8, is pivoted in the curved slots 7, in said wing members 6—6. Said bell cranks 10—10, are normally held in their operative positions, as shown in Figs. 1 and 6, by means of coiled expansion springs, as 11, Fig. 1, which bear outwardly against the inner faces of the upper arms of said bell cranks.

Pivotally mounted at the lower ends of the opposite sides of the drop frame 8 are non-skid shoes, or runners, 12, which have slightly concaved bottoms, as clearly shown in Fig. 4. Formed integrally with the outer lower corners of the drop frame 8, and projecting downwardly on the inner sides of the shoes, or runners, 12—12, are prong-like members 13—13, which first engage the surface as the drop frame 8 is let down, as will be clear from Fig. 2, the point 13 instantly checking any skidding or forward movement of the car. Attached to the front end of each of said shoes, or runners, 12, is a rod 14, which extends forwardly and upwardly through a sleeve 15, pivotally secured to a hanging bracket 16, on the under side of the frame member 1, as clearly shown in Fig. 1. A coiled spring 17 is mounted on the upper end of each of said rods 14 between the sleeve 15 and a nut 18, on the upper end thereof.

We will next describe the mechanism by means of which the drop frame 8 and the non-skid shoes 12 are raised into an inoperative position. Pivotally connected to the middle portion of the drop frame, as at 19, is a toggle 20, the upper part of which is bow-shaped and pivotally secured, as at 21, to the under side of the frame 1, as shown in Fig. 1. An operating rod, or link, 22, is connected at its rear end, as at 23, to the joint of said two-part lever 20, and at its forward end said rod 22 is connected to the lower end of an operating lever 24, by means of a link 22ª, whereby the lower end of said operating lever 24 can have a movement relative to said rod 22. Said operating lever is provided at its upper end with a hand grip and trip lever, as at 24ª, and is adapted to be held in different adjusted positions by means of an arch member 25, provided with holding notches 25ª. Thus it will be seen that when said hand lever 24 is drawn backwardly from its forward position, as shown in full lines, to its rearward position, shown in dotted lines, it operates to swing the drop frame 8, and the non-skid shoes 12—12, up into the positions indicated in dotted lines, Fig. 1, the rods 14 sliding through the sleeves 15 to the position indicated in dotted lines. A spring prong 26 may be used to bear against the drop frame 8, as shown in Fig. 1, if desired, to throw it downwardly when tripped. This spring may be secured at its upper end to the clamp bracket 5, or to the rear axle casing.

Mounted across on the under side of the body frame 1, is a channel iron 27, to the middle of which is secured a supporting plate 28. Pivotally secured to said supporting plate 28, is an arched channel iron 29, adapted to have a slight rocking movement on its pivot connection to said supporting plate 28. The channel iron 27 and the arched channel iron 29, are connected by means of two bolts 30—30, with coiled springs 31—31, thereon between said channel irons, and with coiled springs 32—32 thereon below the arched channel iron 29, as clearly shown in Figs. 1, 3 and 4.

Mounted on the opposite ends of the arched channel iron 29, are bifurcated supporting members 33—33, adapted to receive the upper edges of the non-skid shoes 12—12, when they are raised, as shown in Fig. 3. Two latch dogs 34—34 are pivotally mounted in said holding members 33—33, and are provided at their lower ends with hooks 34ª—34ª, adapted to be moved inwardly and to have supporting engagement with the non-skid shoes 12—12, which are provided with hook-receiving holes 12ª—12ª, as shown in Figs. 1 and 2, and into which the hooks 34ª—34ª of the latch dogs 34—34 catch when said non-skid shoes are raised, as shown in Fig. 3. Connected to the upper ends of the latch dogs 34—34, are two operating rods 35—35, connected at their opposite ends to a three-armed bell crank 36, as clearly shown in Fig. 5, one arm of which bell crank 36, is connected by means of an operating rod 37, to a foot lever 38, as clearly illustrated in Fig. 1, whereby when said foot lever 38 is pressed said bell crank 36 is rocked in such a manner as to draw the upper ends of the latches 34—34 inwardly and release the non-skid shoes 12—12, whereupon the drop frame 8, and said non-skid shoes 12—12, are dropped downwardly into operating position, as shown in Fig. 1.

Before said drop frame 8 and said non-skid shoes 12 can be again drawn up into their raised positions, the bell crank levers 10—10, the lower ends of which bear against the pivot bolts 9—9, in the upper ends of the drop frame 8, must be swung so as to clear said pivot bolts 9—9, in order for them to move upwardly in the slots 7—7, in the wing members 6—6. In order to accomplish this, operating rods, as 39, are connected to said levers 10—10, at their rear ends, and at their forward ends are connected to a cross equalizing bar 40, Fig. 1, which equalizing bar 40 is connected by means of an operating rod 41, to the hand lever 24, by means of a loop, or link 41ª. Thus before said operating lever 24, is drawn rearwardly to raise the drop frame 8, it is moved forwardly slightly so as to pull the rod 41, and through its connections, move the lower ends of the bell crank levers 10—10, out of holding engagement at their lower ends with the pivot pins 9—9. This movement allows the upper ends of the drop frame 8 to move upwardly in the slots 7—7, under the weight of the car, which has been slightly lifted, as will be evident from Fig. 4, whereupon, when said lever 24 is pulled backwardly to the dotted line position shown in Fig. 1, it will draw the drop frame 8, and the non-skid shoes 12—12, up into their raised position, where they will be held by the latch hooks 34ª—34ª, which engage said non-skid shoes 12 in the manner hereinbefore described.

It is to be understood that the drop frame 8 swings downwardly while the car is moving forwardly, whereupon the rear end of the car is slightly raised so that the rear wheels clear the surface, as indicated in Fig. 4. The rigid prongs 13—13 first engage the surface, as in Fig. 2, after which the shoes 12—12, take the load, as in Figs. 1 and 4.

Referring to Fig. 7, we have indicated a locking device in one end of the drop frame 8, adapted for locking the frame in its down position, when desired. A lock bolt 42, is indicated in dotted lines, which may be operated by any suitable key inserted in a key hole 43, said bolt, when in locked position, as shown in dotted lines, extends into the wing members 6, in the manner indicated. When said bolt 42 is withdrawn from the wing member 6, said drop frame 8, can be raised in the manner hereinbefore described.

Thus it will be seen that we have provided a very effective combination non-skid device and emergency brake mechanism which is designed to stop and prevent skidding movement, and also to operate to stop the machine as a brake when released and dropped into operating position, for the whole weight of the rear end of the machine is raised up on to prongs 13—13 and the shoes 12.

While we have illustrated one practical embodiment of our invention, we do not limit it to the details here shown, except as we may be limited by the hereto appended claims.

We claim:

1. In combination with an automobile, a drop frame adjustably and pivotally connected at its upper end to the rear axle housing of said automobile, means for holding said pivoted upper end in its operative position, means for limiting the rearward movement of said drop frame, when down, whereby it lifts the rear end of said automobile, means for releasing the upper end of said drop frame, whereby to let said automobile down, and means for lifting said drop frame into a raised position, substantially as described.

2. In combination with an automobile, a drop frame pivotally connected to the rear axle casing, the lower end of said drop frame being provided with a prong and a non-skid shoe adapted to successively engage the surface as said drop frame is lowered, and means for holding said drop frame in its adjusted positions, substantially as described.

3. In combination with an automobile, a drop frame pivotally and adjustably connected at its upper end to the rear axle casing, means for holding said upper end in an operating position, the lower end of said drop frame being provided with a prong and a non-skid shoe adapted to successively engage the surface as said drop frame is lowered, means for limiting the rearward movement of said drop frame, means for raising the same, means for holding the same in its raised position, and means for releasing the same, whereby to allow it to drop into its down or operating position, substantially as described.

4. In a device of the character referred to, a pivoted drop frame, means for raising the same, a latch mechanism for holding the same in raised position, means for tripping said latch mechanism, whereby to allow said drop frame to drop, and a lock for locking the same in its down position, substantially as described.

5. In combination with an automobile, a drop frame pivotally and adjustably connected at its upper end to the rear axle casing, means for holding the upper end of said drop frame against movement relative to said axle, the lower end of said drop frame being adapted to engage the surface when dropped during the forward movement of said automobile, whereby to lift the rear end of said automobile, means for limiting the rearward movement of said drop frame, and means for releasing the upper end of said drop frame, whereby to let the rear end of said automobile down, substantially as described.

Signed at Portland, Multnomah county, Oregon, this 3rd day of July, 1917.

CHARLES E. HEWSTON.
HERBERT G. HAMILTON.

In presence of—
I. M. GRIFFIN,
W. R. LITZENBERG.